United States Patent Office 3,053,613
Patented Sept. 11, 1962

3,053,613
METHOD OF PURIFYING GASES CONTAINING OXYGEN AND OXIDES OF NITROGEN
Holger C. Andersen, Morristown, N.J., assignor, by mesne assignments, to Engelhard Industries, Inc., Newark, N.J., a corporation of Delaware
No Drawing. Filed June 25, 1959, Ser. No. 822,751
10 Claims. (Cl. 23—2)

This invention relates to a process for effecting combustion reactions of a gas containing oxides of nitrogen and oxygen in which, in a first reaction stage, ammonia is added to the gas and the resulting admixture is catalytically treated in the first reaction zone to selectively reduce the oxides of nitrogen. The effluent gases from the first reaction stage are then catalytically treated in a second catalytic stage to recover heating values from the gas.

Typical industrial gases which may be treated in accordance with the process of the present invention are the waste or stack gases from nitric acid plants and various nitration processes. Such gases constitute a widespread air pollution problem, and many processes have been developed or proposed for removing the contaminants which are, primarily, nitrogen dioxide and nitric oxide. The dioxide exits in equilibrium with the dimer, $N_2O_4$; it is common practice to refer to the two oxides of tetravalent nitrogen collectively as nitrogen dioxide.

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process the oxygen present in the waste gases is removed by a catalytic combustion reaction, and the oxides of nitrogen are converted to nitrogen and water. In catalytic processes of this type, it has been found that it is generally necessary to have a fuel present in a stoichiometric excess over the oxygen content of the waste gas and, under such conditions, a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, now Patent No. 2,970,034, one method of overcoming the foregoing deficiency is disclosed in which the removal of oxygen and the catalytic reduction of the oxides of nitrogen in waste or tail gases is effected in two stages in such a manner that only a part of the total heat is generated in each stage. The temperature to which the catalyst is subjected is thus decreased and its life and activity are correspondingly extended.

In copending application Serial No. 694,502, filed November 5, 1957, now Patent No. 2,975,025, a process is disclosed for the selective removal of oxides of nitrogen from waste or tail gases without appreciable consumption of the oxygen present in the gases and, in this process, ammonia is used as the fuel. In this process, the gaseous mixture is passed over a supported platinum group metal-containing catalyst, whereby selective removal of the oxides of nitrogen from the oxygen-containing gas is effected.

In copending application Serial Number 803,065, filed March 31, 1959, now abandoned, there is disclosed a process in which hydrogen or other easily ignitible fuel is added to a gas stream which contains at least nitric oxide and nitrogen dioxide and which may also contain oxygen and inert gases. The mixture is passed over a suitable catalyst, i.e. a platinum group metal-containing catalyst, preferably platinum, ruthenium, palladium or rhodium. In this process, the nitrogen dioxide is selectively reduced to nitric oxide.

In copending application Serial Number 807,004, filed April 17, 1959, hydrogen or other easily ignitible fuel is used in conjunction with ammonia to improve the ammonia selective removal process described and claimed in application Serial No. 694,502, and the hydrogen may be mixed with the ammonia and passed through a single bed of catalyst, or the hydrogen may be added to the main gas stream which is passed through a first catalyst bed, after which the semi-treated gas is mixed with ammonia, and treated catalytically in a second catalyst bed. In addition, the single catalyst bed may be comprised of a number of layers of different catalytic materials such that the gas to be treated contacts a first catalyst and a second catalyst in the same bed, or the separate catalyst beds may be comprised of the same or different catalysts.

Thus, the processes of the foregoing copending applications broadly fall in either of two categories; (1) non-selective processes in which a reducing gas is added to a waste gas stream containing oxides of nitrogen and oxygen and the mixture is passed over a suitable catalyst. In these processes, the reducing gas is oxidized and considerable heat is evolved which may be economically recovered. Only if the reducing gas is in excess of the combined oxygen and nitrogen oxides, however, is the concentration of the latter appreciably reduced; (2) selective processes in which ammonia is added to the waste gas stream and the mixture is passed over a suitable catalyst. In these cases, only a small amount of ammonia over that required for reaction with the nitrogen oxides is used, and the nitrogen oxides are substantially completely removed, even when there is a net oxidizing condition in the stream. Only a relatively small fuel addition is required in this type of process, and the heat generation is small in comparison with that characteristic of the non-selective processes.

Careful consideration of these two fundamentally distinct processes shows that each has applicability to certain conditions. For example, where heat is required, process (1) above may be the most desirable, but if the oxygen content of the stream to be treated exceeds about 3 to 4 percent, by volume, process (1) cannot be applied in its simple form, because the catalyst and catalyst vessel will generally become overheated. In this case, the process must be modified, for example, by recycling the gases to reduce the oxygen content of the gases entering the catalyst bed, or by removing the oxygen in two or more stages, as disclosed in application Serial No. 650,860.

The non-selective process is, furthermore, unattractive when considered in connection with existing nitric acid installations where removal only of oxides of nitrogen is required. In these circumstances, the heat evolved cannot be recovered with existing equipment and may, therefore, constitute a nuisance rather than an economic value. The selective process overcomes some of these objections inasmuch as it is inherently independent of the oxygen content of the stream and the heat problem largely disappears. In those situations where heat is desirable, however, the selective process is disadvantageous in that it is generally uneconomical to obtain heat by combustion of ammonia, since ammonia is a comparatively expensive fuel.

To overcome the difficulties in both the non-selective and the selective processes, as discussed above, the present invention relates to a combination process in which the waste gas containing oxides of nitrogen and oxygen is treated first in a selective stage and, second, in a non-selective stage. The combination process thus accomplishes removal of oxides of nitrogen in the first stage, and desirable heat generation in the second stage.

In utilizing the process of the present invention, a waste gas stream containing several percent, by volume, of oxygen and several tenths of a percent, or more, by volume, of nitric oxide and nitrogen dioxide is admixed with a quantity of ammonia gas, the latter being added in an amount slightly in excess of that required for stoichiometric reaction with the oxides of nitrogen. The mixture is then passed over a catalyst which effects the selective reaction of ammonia and the oxides of nitrogen, usually in a temperature range of about 150 to 300° C. The catalyst employed in the first reaction stage may be palladium, platinum, ruthenium, or other platinum group metals, or cobalt, iron or nickel, as described in copending applications Serial Nos. 694,502 and 739,991, now Patent No. 3,008,796. The ammonia need not be perfectly balanced with the nitrogen oxides content of the stream since, depending upon specific conditions such as catalyst activity, temperature and space velocity, the ammonia excess will either decompose, burn to nitrogen or will pass through the first reaction stage unconverted.

Depending upon the choice of conditions in the second reaction stage, either of these situations may be tolerated. To the gas emerging from the first reaction stage, now substantially free of oxides of nitrogen but generally containing considerable oxygen, a fuel, preferably hydrogen, is added, the amount to be added being dictated largely by the temperature rise which it is desired to obtain. The amount to be added thus may be equal to, or considerably less than, the remaining oxygen content. The only fundamental limitation is that the amount added be less than that corresponding to explosive concentrations and less than will, as a result of excessive temperatures, cause damage to the catalyst itself or to the catalyst-containing vessel.

The fuel-waste gas mixture is passed over the second stage catalyst, which may be any material effecting the fuel-oxygen reaction at temperatures generally higher than 150° C. but which is preferably supported palladium, platinum, rhodium, ruthenium, or other platinum-group metal, which will promote the desired catalytic combustion at high space velocities. The effluent gas from the second reaction stage is free of nitrogen oxides, and at a temperature suited to the intended end use is delivered to a turbine, boiler, heat exchanger, or other equipment.

From the foregoing, it will be seen that the combination process of the invention affords great flexibility of application; for example, it has been found that the process can be applied to the purification of air containing oxides of nitrogen. As indicated previously, the high oxygen content of air makes the previously known processes inapplicable except with considerable modification.

Some consideration must be given to the choice of fuel used in the second reaction stage. If the conditions in the first stage are such that no unreacted ammonia is present in the first stage effluent gases any fuel may be used in the second stage consistent with the ability of the second stage catalyst to ignite it in the oxygen-containing stream. However, if some ammonia passes through the first stage unconverted, there is a possibility of forming gaseous cyanides if a carbon-containing fuel is used, and, in such cases, it is better to employ hydrogen as the fuel in the second reaction stage.

The possibility that the unconverted ammonia from the first reaction stage might be reoxidized to the undesired oxides of nitrogen in the second stage reaction is a problem which is inherent in this type of process. However, it has been found in the present process that such reoxidation is either slight or non-existent.

The platinum group metal catalysts or iron, nickel or cobalt catalysts used in the first reaction stage may be used in pure form or the platinum group metals may be used in admixture with each other. The catalyst metal content should be in the range of about 0.01 to 2 percent, by weight, of the combined catalyst metal and support, where a catalyst support is used for the platinum group metals, or about 0.5 to 20 percent, by weight, in the case of the iron-cobalt-nickel group. Where catalyst supports are employed, they may be in the form of pellets, granules or powder, and may be any of the well known catalyst supports such as activated alumina, silica gel, kieselguhr, diatomaceous earth, silica alumina, and the like.

The second stage catalyst preferably is palladium, platinum, ruthenium or rhodium, per se, or in combination with each other, and less active metals such as nickel and iron may be used, particularly at low space velocities, elevated inlet temperatures and with easily ignited fuels such as hydrogen. These catalysts may be supported in the same manner as the catalysts employed in the first stage and may have metal contents, when supported, similar to those of the first stage catalysts.

The compositions of the gases which may be treated in accordance with the invention include those gases containing, by volume, from 0 to 22 percent oxygen, 0 to 2 percent nitric oxide, 0 to 2 percent nitrogen dioxide, and 0 to 8 percent water vapor, the balance being an inert gas or gases such as nitrogen, argon, helium, and the like. An important feature of this invention is the flexibility thereof with regard to gas composition. For example, it may be applied to the treatment of effluent gases from a nitric acid plant at "startup conditions," when the oxygen content is very high, as well as at steady running conditions when the oxygen content is typically 3 to 4 percent, by volume. At both extremes of conditions, the process of the present invention will provide nitrogen oxides removal and desired heat generation within limits of design and safety.

In the first reaction stage, the ammonia may be added to the gas mixture to be treated in an amount in the range of the stoichiometric quantity required for reaction with the oxides, to ten times or more the quantity required, preferably less than two times this quantity.

In the second reaction stage, any fuel ignitible by the second-stage catalyst may be used but, generally, it is preferable to use hydrogen in order to avoid the possibility of cyanide formation by reaction of the carbon-containing fuel with oxygen and any ammonia possibly coming through the first stage reaction. The quantity of fuel to be added depends upon the degree of temperature rise desired in the gas stream, temperature limitations of the second-stage catalyst, associated vessel and piping, and exposure limitations. In general, temperatures in excess of 900° C. are not utilized, especially at elevated pressures, because of equipment structural limitations. The amount of fuel also may be less than, equal to, or in excess of the oxygen present. If the fuel is present in a quantity less than the oxygen content, little or no change in the nitrogen oxides content will occur within certain limits of temperature and ammonia concentration (from the first stage). If the fuel is in excess over the oxygen, the nitrogen oxides content generally will be further reduced from the value produced by the first stage.

The space velocity in the first reaction stage may be in the range of about 3,000 to 100,000 standard volumes of gas per volume of catalyst per hour and, in the second stage, the space velocity may be in the range of 3,000 to 300,000 standard volumes per volume per hour, the velocities in the higher end of this range being utilized with suitably prepared platinum-group metal catalysts.

The pressure may be in the range of atmospheric to 150 p.s.i.g. or more, and the optimum reaction temperatures will generally be different for the two reaction stages.

In the first reaction stage, the reaction temperature may be in the range of about 150 to 400° C., preferably about 160 to 300° C. Generally, it is found that selectivity of nitrogen oxides removal with ammonia, in the presence of oxygen, is optimum in this temperature range.

In the second reaction stage, the reaction temperature may be in the range of the temperature at which the catalyst will ignite the fuel to about 900° C. Practically, design considerations will usually provide for an inlet temperature which approximates the outlet temperature of the effluent gases from the first stage, in order to avoid the use of a heat exchanger between stages. However, a heat exchanger between stages may be used if desired. The most practical reaction temperature range for the second stage is about 150 to 800° C.

The invention will be further illustrated by reference to the following specific examples, in which all gaseous percentages are by volume:

*Example I*

A simulated nitric acid plant waste gas stream was prepared by metering nitrogen and air together at a pressure of 120 p.s.i.g., and then adding to the main stream a suitable flow of nitric oxide from a high pressure cylinder. The flows were arranged so that the waste gas had the composition of 4 percent oxygen, 0.3 percent nitric oxide, 0.7 percent water vapor and the balance was nitrogen. This simulated waste gas was then passed through a gas-fired heater and into a catalyst chamber at a pressure of 100 p.s.i.g. The catalyst chamber, a 1.05-inch internal diameter stainless steel pipe, contained two charges of catalyst: an upper or first stage consisted of 100 ml. of 0.5 percent platinum on ⅛ inch cylindrical activated alumina pellets, and the lower, or second stage, consisted of 100 ml. of 0.5 percent palladium on nominal ¼ inch diameter activated 6% silica, 94% alumina spheres. Ammonia was added through a rotameter, upstream of the first stage catalyst and "bleeder gas" between the first and second stage catalyst beds. This bleeder gas contained 65 percent hydrogen, 10 percent methane and 25 percent nitrogen.

With gas flows set to produce a space velocity of 60,000 s.c.f.h./c.f. catalyst in each stage, the heater was adjusted so that the inlet temperature to the first stage was 221° C., and 0.3 percent ammonia was added. Analysis downstream of the first stage showed that nitric oxide concentration had decreased from 0.3 percent to 95 p.p.m.

Next, 3.8 percent bleeder gas was added to the main gas stream ahead of the second stage, whereupon the temperature rose from 272 to 384° C. Analysis showed the gas to contain 124 p.p.m. of nitric oxide and 2.4 percent oxygen.

During the same experiment, the first-stage inlet temperature and second stage bleeder gas addition were both increased. The data observed are as follows:

First stage:
    238° C. in
    262° C. bed temperature
    152 p.p.m. NO out
Second stage:
    5.9 percent bleeder gas
    255° C. in
    610° C. bed temperature
    146 p.p.m. NO out

*Example II*

Another run was made following the general procedure of Example I above, except that sufficient bleeder gas was added to produce reducing conditions in the second stage, i.e. the fuel was in stoichiometric excess over the oxygen. The data are as follows:

First stage:
    0.3 percent ammonia
    228° C. in
    251° C. bed temperature

Second stage:
    7.7 percent bleeder gas
    244° C. in
    696° C. bed temperature
    9 p.p.m. NO out
    0.0 percent O₂ out

*Example III*

The general procedure of Example I was repeated, with the exception that air rather than a dilute mixture of oxygen in nitrogen was used as the main gas. Nitric oxide and water vapor were both added to the air, and the composition of the gas entering the first reaction stage was:

|  | Percent |
|---|---|
| Oxygen | 19.7 |
| Nitric oxide | 0.42 |
| Water vapor | 0.5 |
| Ammonia | 0.42 |

The space velocity was 40,000 s.c.f.h./c.f. per stage. With 242° C. inlet temperature, a first-stage bed temperature of 278° C. was observed, and the nitric oxide content decreased to 204 p.p.m.

Before the gas entered the second stage, 4.7 percent bleeder gas was added thereto and, under these conditions, the second-stage catalyst acted as an igniter with the result that a high temperature was observed ahead of the second stage catalyst due to the resulting "flashback." The catalyst bed temperature was 508° C. and the nitric oxide and oxygen content of the final stream were 261 p.p.m. and 17.7 percent, respectively.

It will be obvious to those skilled in the art that many modifications may be made within the scope of the present invention without departing from the spirit thereof, and the invention includes all such modifications.

What is claimed is:

1. A process for effecting the catalytic reduction of nitrogen oxides present in a gas containing oxygen, nitric oxide, nitrogen dioxide and an inert gas, which comprises adding ammonia to the gas in at least the stoichiometric quantity required for reaction with the nitrogen oxides contained there, contacting the resulting admixture at reaction temperature in a first reaction zone with a catalyst selected from the group consisting of iron, cobalt, nickel and platinum group metal-containing catalysts whereby the nitrogen oxides are removed from the gas by selective reduction, adding a fuel selected from the group consisting of hydrogen and a hydrocarbon to the effluent gas containing oxygen, and contacting the resulting admixture at reaction temperature in a second reaction zone with a catalyst selected from the group consisting of iron, cobalt, nickel and platinum group metal-containing catalysts, whereby a high heat release is effected in the second reaction zone.

2. A process for effecting the catalytic reduction of nitrogen oxides present in a gas containing nitric oxide, nitrogen dioxide, oxygen and an inert gas, which comprises adding ammonia to the gas in at least the stoichiometric quantity required for reaction with the nitrogen oxides contained therein, contacting the resulting admixture at a temperature in the range of about 150° C. to 400° C. in a first reaction zone with a catalyst selected from the group consisting of iron, cobalt, nickel and platinum group metal-containing catalysts whereby the nitrogen oxides are removed from the gas by selective reduction, adding a fuel selected from the group consisting of hydrogen and a hydrocarbon to the effluent gas containing oxygen, and contacting the resulting admixture at a temperature in the range of about 150° C. to 900° C. in a second reaction zone with a catalyst selected from the group consisting of iron, cobalt, nickel and platinum group metal-containing catalysts, whereby a high heat release is effected in the second reaction zone.

3. A process according to claim 1 in which the catalyst in the second reaction zone is platinum.

4. A process according to claim 1 in which the catalyst in the second reaction zone is palladium.

5. A process according to claim 1 in which the catalyst in the second reaction zone is ruthenium.

6. A process according to claim 1 in which the catalyst in the second reaction zone is rhodium.

7. A process according to claim 1 in which the catalyst in the first reaction zone is platinum.

8. A process according to claim 1 in which the catalyst is deposited on a carrier.

9. A process according to claim 1 in which the catalyst is deposited on a carrier from the group of activated alumina and activated silica alumina.

10. A process according to claim 1 in which the catalyst is in finely divided form and is deposited upon a carrier.

References Cited in the file of this patent

UNITED STATES PATENTS

| 2,076,953 | Lacy | Apr. 13, 1937 |
| 2,910,343 | Childers et al. | Oct. 27, 1959 |

OTHER REFERENCES

Michailova: "The Kinetics of the Reaction Between Ammonia and Nitric Oxide on the Surface of a Platinum Filament," Acta Physicochimica U.R.S.S., published by the Academy of Sciences of the U.S.S.R., Moscow, volume 10, No. 5, 1939, pp. 653–676.

Rideal and Taylor: "Catalysis in Theory and Practice," Macmillan and Co., Ltd., London, 2d Ed., 1926, page 246.